US012639542B2

(12) United States Patent
Diorio et al.

(10) Patent No.: US 12,639,542 B2
(45) Date of Patent: *May 26, 2026

(54) RFID ICS WITH PRIVACY MODES

(71) Applicant: Impinj, Inc., Seattle, WA (US)

(72) Inventors: Christopher J. Diorio, Shoreline, WA (US); Jesse Paul Cooke, Seattle, WA (US); Christopher Dean Peterson, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/770,716

(22) Filed: Jul. 12, 2024

(65) Prior Publication Data

US 2024/0370686 A1    Nov. 7, 2024

Related U.S. Application Data

(63) Continuation of application No. 17/762,940, filed as application No. PCT/US2020/057643 on Oct. 28, 2020, now Pat. No. 12,039,390.

(60) Provisional application No. 62/929,210, filed on Nov. 1, 2019, provisional application No. 62/927,210, filed on Oct. 29, 2019.

(51) Int. Cl.
*H04W 4/80* (2018.01)
*G06K 19/073* (2006.01)
*G06K 19/077* (2006.01)

(52) U.S. Cl.
CPC . *G06K 19/07309* (2013.01); *G06K 19/07749* (2013.01); *H04W 4/80* (2018.02)

(58) Field of Classification Search
None
See application file for complete search history.

(56) References Cited

U.S. PATENT DOCUMENTS

2008/0211637 A1* 9/2008 Smith ................. G06Q 20/341
340/10.42

FOREIGN PATENT DOCUMENTS

EP      3261016 A2   12/2017
WO   2019062531 A1    4/2019

OTHER PUBLICATIONS

European Search Report App. No. EP20882214.8 mailed on Nov. 2, 2022, pp. 4.

(Continued)

*Primary Examiner* — John F Mortell
(74) *Attorney, Agent, or Firm* — Turk IP Law, LLC

(57) ABSTRACT

RFID tag ICs may be configured with privacy modes. When a tag IC is in a privacy mode, it will not respond to commands unless a previous command includes correct verification information or specifies a recycling indicator of the tag IC. If the previous command includes correct verification information, then the tag IC will respond to one or more subsequent commands as normal, for example by responding with one or more identifiers. If the previous command does not include correct verification information but specifies a recycling indicator and the privacy mode is recycling-enabled, the tag IC may respond to one or more subsequent commands with recycling information. The recycling information identifies whether or how an item associated with the RFID IC can be recycled or disposed but does not otherwise identify the RFID IC or item. Otherwise, the tag IC may remain silent.

20 Claims, 10 Drawing Sheets

1200

(56)  References Cited

OTHER PUBLICATIONS

International Search Report and Written Opinion for International Application No. PCT/US2020/057643 mailed on Jan. 27, 2021, pp. 16.

Notice of Allowance for U.S. Appl. No. 17/762,940 mailed on Mar. 20, 2024, pp. 13.

Office Action for U.S. Appl. No. 17/762,940 mailed on Jan. 3, 2024, pp. 19.

Supplementary European Search Report App. No. EP20882214.8 mailed on Nov. 2, 2022, pp. 2.

* cited by examiner

100

200

250

260

300

*RFID SYSTEM COMMUNICATION*

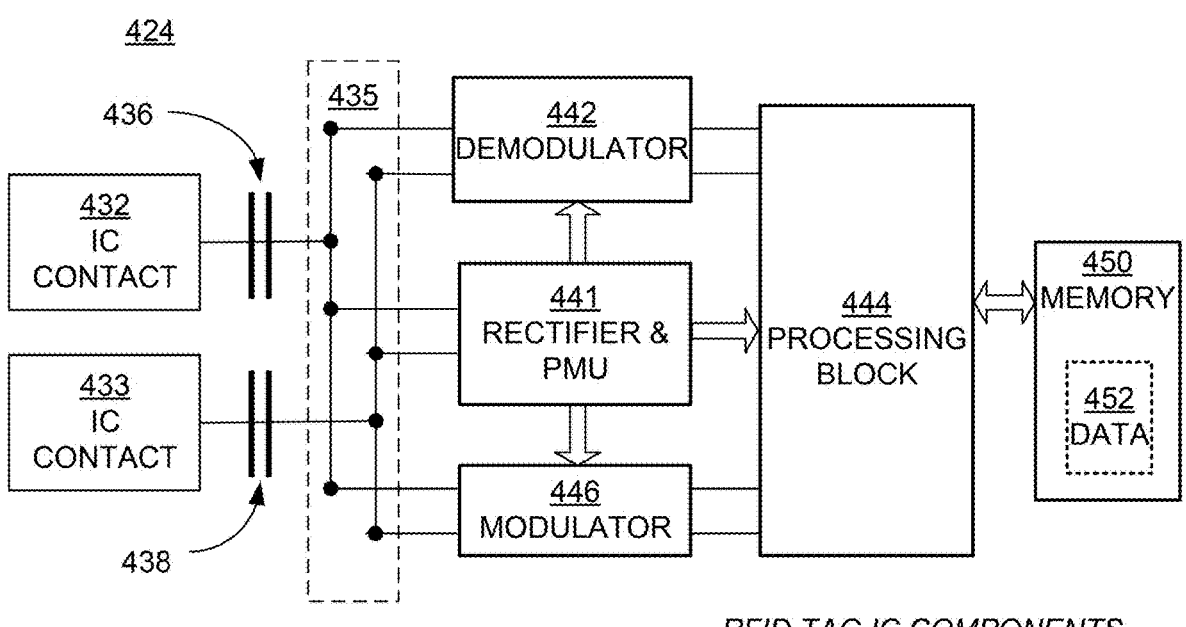
FIG. 4
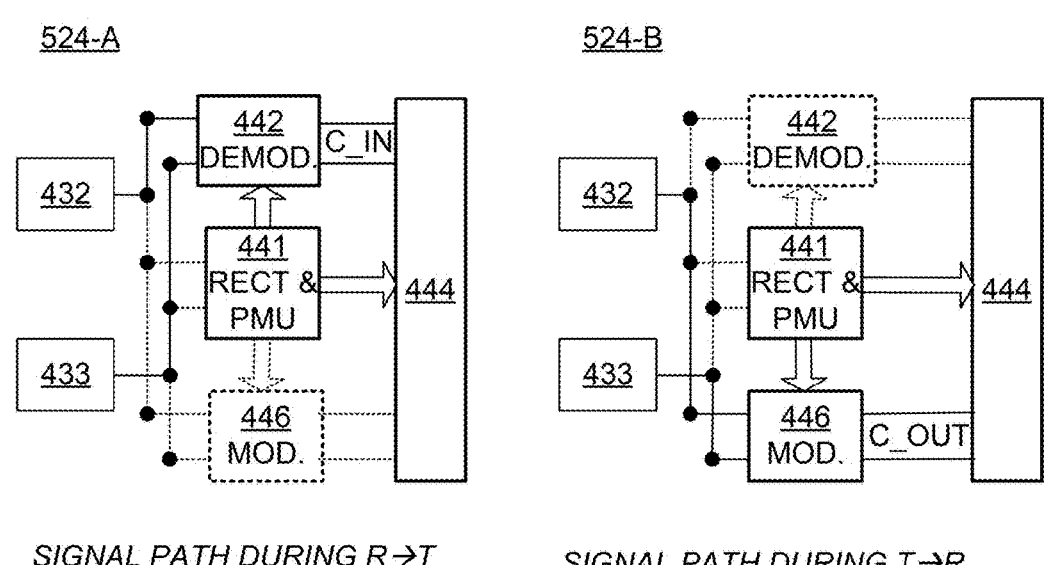
*SIGNAL PATH DURING R→T*          *SIGNAL PATH DURING T→R*
FIG. 5A          FIG. 5B

800

1100

1200

RFID ICS WITH PRIVACY MODES

CROSS-REFERENCE TO RELATED APPLICATIONS

This application claims priority to U.S. Provisional Patent Application Ser. No. 62/927,210 filed on Oct. 29, 2019 and U.S. Provisional Patent Application Ser. No. 62/929,210 filed on Nov. 1, 2019. The disclosures of the Provisional Applications are hereby incorporated by reference in their entirety.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package. The RFID tag typically includes, or is, a radio-frequency (RF) integrated circuit (IC).

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. An "inventory round" is defined as a reader staging RFID tags for successive inventorying. The reader transmitting an RF wave performs the inventory. The RF wave is typically electromagnetic, at least in the far field. The RF wave can also be predominantly electric or magnetic in the near or transitional near field. The RF wave may encode one or more commands that instruct the tags to perform one or more actions. The operation of an RFID reader sending commands to an RFID tag is sometimes known as the reader "interrogating" the tag.

In typical RFID systems, an RFID reader transmits a modulated RF inventory signal (a command), receives a tag reply, and transmits an RF acknowledgement signal responsive to the tag reply. A tag that replies to the interrogating RF wave does so by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section includes an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID tags and ICs with a recycling-enabled privacy mode. When an RFID IC is in a recycling-enabled privacy mode, it will not respond to commands unless a previous command either (a) includes correct verification information or (b) specifies a recycling indicator of the RFID IC. If the previous command includes correct verification information, then the RFID IC will respond to one or more subsequent commands as normal (i.e., as if it were not in the recycling-enabled privacy mode), for example by responding with one or more identifiers. If the previous command specifies a recycling indicator of the RFID IC, then the RFID IC will respond to one or more subsequent commands with recycling information. The recycling information identifies whether or how an item associated with the RFID IC can be recycled or disposed but does not otherwise uniquely identify the RFID IC or item.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 1:
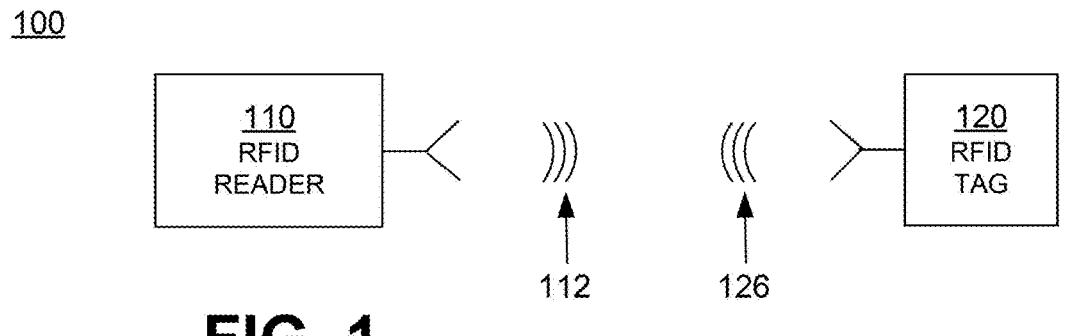
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies. Some portions of memory may be writeable and some not. "Instruction" refers to a request to a tag to perform a single explicit action (e.g., write data into memory). "Command" refers to a reader request for one or more tags to perform one or more actions, and includes one or more tag instructions preceded by a command identifier or command code that identifies the command and/or the tag instructions. "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Protocol"), versions 1.2.0 and 2.0 of which are hereby incorporated by reference.

RFID system users understandably have privacy concerns regarding access to RFID tag IC data. For example, a consumer that has purchased an item with an RFID tag IC may not want random RFID readers to be able to retrieve information from the RFID tag IC. One potential solution is to allow RFID tag ICs to enter a "privacy mode." When an RFID tag IC is in the privacy mode, it will only respond to commands from authorized RFID readers and will ignore commands from unauthorized RFID readers. Several examples of privacy modes are described in commonly assigned U.S. Pat. No. 10,402,710, issued on Sep. 3, 2019, hereby incorporated by reference in its entirety.

RFID tag ICs may have different kinds of privacy modes. In one privacy mode, an RFID tag IC may not respond to any unauthorized RFID readers. In another privacy mode, an RFID tag IC may only respond to certain commands, with limited information.

As an example of the latter, suppose that an RFID tag IC stores information about how an associated item can be recycled or disposed of. Such information, referred to as recycling information, may include item composition, handling instructions, potential hazards, or other similar information. A consumer, upon purchasing the item, places the tag IC into a recycling-enabled privacy mode. At some later time, the consumer discards the item, but neglects to take the tag IC out of the privacy mode. In this case, because the privacy mode is recycling-enabled, an RFID reader may be able to retrieve recycling information from the tag IC. However, the RFID reader would not be able to retrieve other, non-recycling-related information from the tag IC.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 May generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHZ, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

Figure 2:
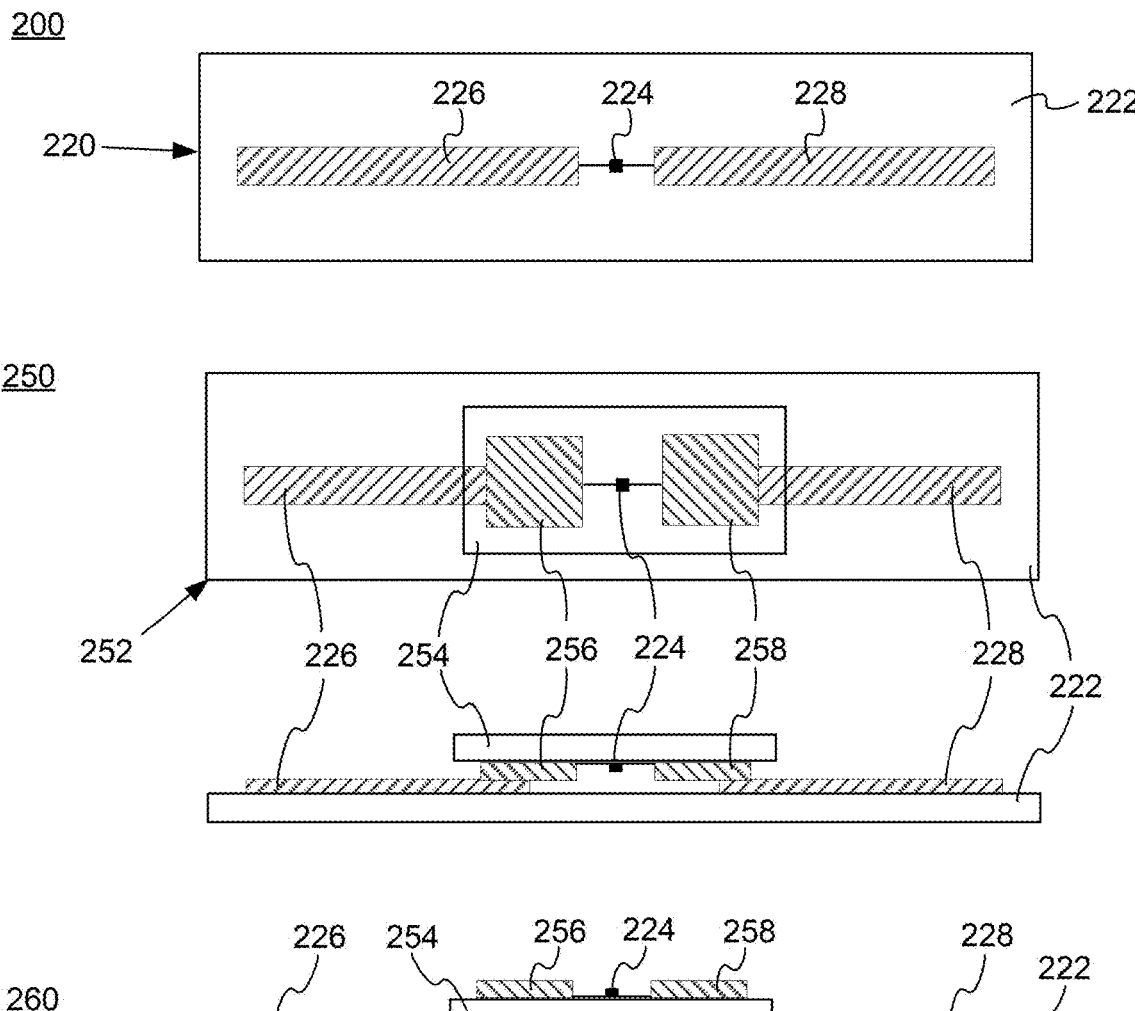
FIG. 2 is a diagram showing components of a passive RFID tag, such as a tag that can be used in the system of FIG. 1.

FIG. 2 is a diagram of an RFID tag 220, which may function as tag 120 of FIG. 1. Tag 220 may be formed on a substantially planar inlay 222, which can be made in any suitable way. Tag 220 includes a circuit which may be implemented as an IC 224. In some embodiments IC 224 is fabricated in complementary metal-oxide semiconductor (CMOS) technology. In other embodiments IC 224 may be fabricated in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. In some embodiments the antenna can be etched, deposited, and/or printed metal on inlay 222; conductive thread formed with or without substrate 222; nonmetallic conductive (such as graphene) patterning on substrate 222; a first antenna coupled inductively, capacitively, or galvanically to a second antenna; or can be fabricated in myriad other ways that exist for forming antennas to receive RF waves. In some embodiments the antenna may even be formed in IC 224. Regardless of the antenna type, IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. Electrically coupling and uncoupling the IC contacts of IC 224 can modulate the antenna's reflectance, as can varying the admittance or impedance of a shunt-connected or series-connected circuit element which is coupled to the IC contacts. If IC 224 is capable of transmitting signals (e.g., has its own power source, is coupled to an external power source, and/or can harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, may be partly fabricated before attachment to the item or packaging and then completely fabricated upon attachment to the item or packaging, or the manufacturing process of the item or packaging may include the fabrication of the RFID tag. In some embodiments, the RFID tag may be integrated into the item or packaging. In this case, portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. Thus, an "RFID IC" need not be distinct from an item, but more generally refers to the item containing an RFID IC and antenna capable of interacting with RF waves and receiving and responding to RFID signals. Because the boundaries between IC, tag, and item are thus often blurred, the term "RFID IC", "RFID tag", "tag", or "tag IC" as used herein may refer to the IC, the tag, or even to the item as long as the referenced element is capable of RFID functionality.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

Figure 3:
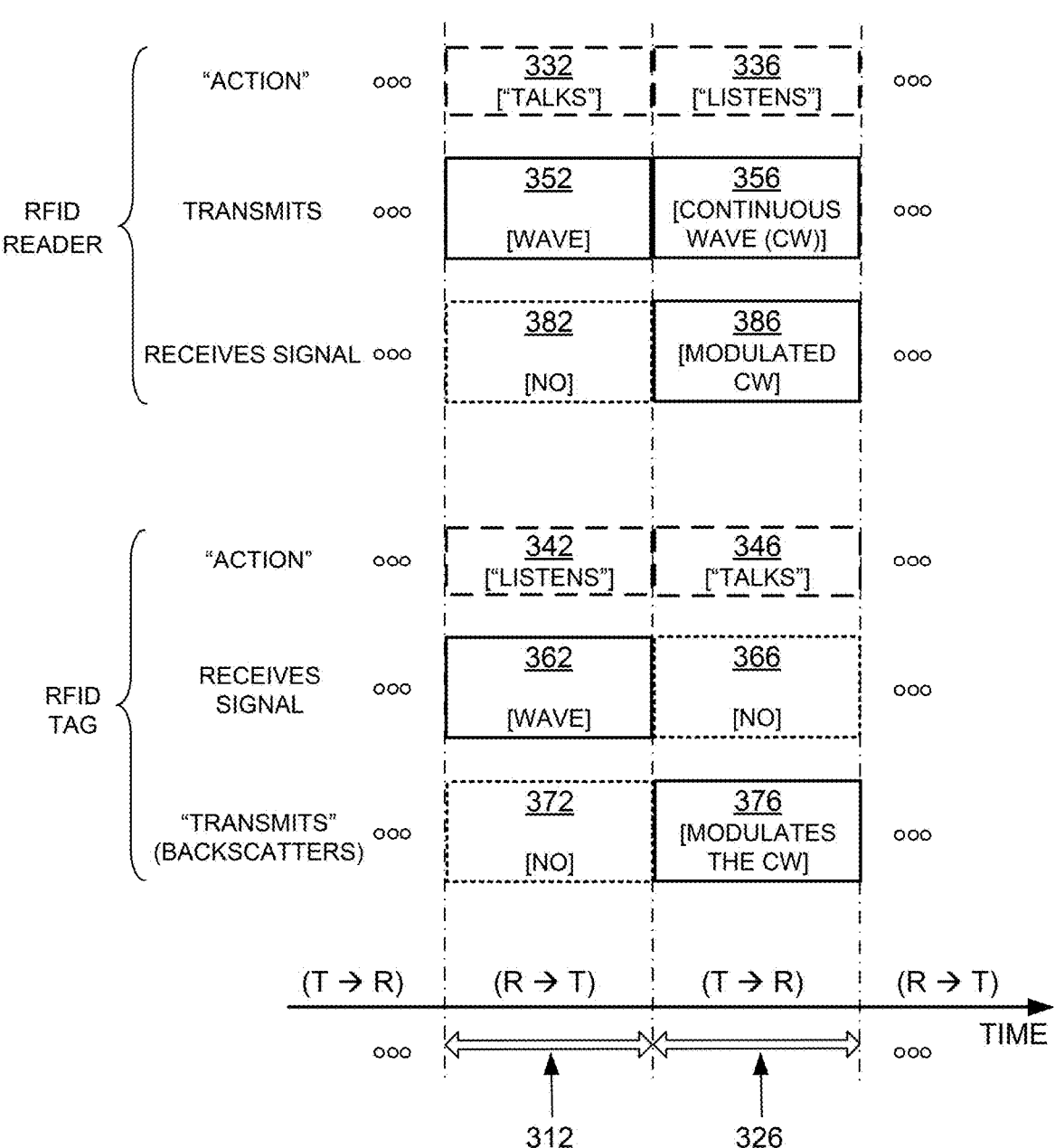
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 talks (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal, which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

FIG. 4 is a block diagram showing a detail of an RFID IC, such as IC 224 in FIG. 2. Electrical circuit 424 may be implemented in an IC, such as IC 224. Circuit 424 implements at least two IC contacts 432 and 433, suitable for coupling to antenna segments such as antenna segments 226/228 in FIG. 2. When two IC contacts form the signal input from and signal return to an antenna they are often referred-to as an antenna port. IC contacts 432 and 433 may be made in any suitable way, such as from electrically-conductive pads, bumps, or similar. In some embodiments circuit 424 implements more than two IC contacts, especially when configured with multiple antenna ports and/or to couple to multiple antennas.

Circuit 424 includes signal-routing section 435 which may include signal wiring, signal-routing busses, receive/transmit switches, and similar that can route signals between the components of circuit 424. IC contacts 432/433 may couple galvanically, capacitively, and/or inductively to signal-routing section 435. For example, optional capacitors 436 and/or 438 may capacitively couple IC contacts 432/433 to signal-routing section 435, thereby galvanically decoupling IC contacts 432/433 from signal-routing section 435 and other components of circuit 424.

Capacitive coupling (and the resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In these embodiments, galvanically decoupling IC contact 432 from IC contact 433 may prevent the formation of a DC short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 includes a rectifier and PMU (Power Management Unit) 441 that harvests energy from the RF signal incident on antenna segments 226/228 to power the circuits of IC 424 during either or both reader-to-tag (R→T) and tag-to-reader (T→R) intervals. Rectifier and PMU 441 may be implemented in any way known in the art and may include one or more components configured to convert an alternating-current (AC) or time-varying signal into a direct-current (DC) or substantially time-invariant signal.

Circuit 424 also includes a demodulator 442, a processing block 444, a memory 450, and a modulator 446. Demodulator 442 demodulates the RF signal received via IC contacts 432/433, and may be implemented in any suitable way, for example using a slicer, an amplifier, and other similar components. Processing block 444 receives the output from demodulator 442, performs operations such as command decoding, memory interfacing, and other related operations, and may generate an output signal for transmission. Processing block 444 may be implemented in any suitable way, for example by combinations of one or more of a processor, memory, decoder, encoder, and other similar components. Memory 450 stores data 452 and may be at least partly implemented as permanent or semi-permanent memory such as nonvolatile memory (NVM), EEPROM, ROM, or other memory types configured to retain data 452 even when circuit 424 does not have power. Processing block 444 may be configured to read data from and/or write data to memory 450.

Modulator 446 generates a modulated signal from the output signal generated by processing block 444. In one embodiment, modulator 446 generates the modulated signal by driving the load presented by antenna segment(s) coupled to IC contacts 432/433 to form a backscatter signal as described above. In another embodiment, modulator 446 includes and/or uses a transmitter to generate and transmit the modulated signal via antenna segment(s) coupled to IC contacts 432/433. Modulator 446 may be implemented in any suitable way, for example using a switch, driver, amplifier, and other similar components. Demodulator 442 and modulator 446 may be separate components, combined in a single transceiver circuit, and/or part of processing block 444.

In some embodiments, particularly in those with more than one antenna port, circuit 424 may contain multiple demodulators, rectifiers, PMUs, modulators, processing blocks, and/or memories.

FIG. 5A shows version 524-A of components of circuit 424 of FIG. 4, further modified to emphasize a signal operation during a R→T interval (e.g., time interval 312 of FIG. 3). During the R→T interval, demodulator 442 demodulates an RF signal received from IC contacts 432/433. The demodulated signal is provided to processing block 444 as C_IN, which in some embodiments may include a received stream of symbols. Rectifier and PMU 441 may be active, for example harvesting power from an incident RF waveform and providing power to demodulator 442, processing block 444, and other circuit components. During the R→T interval, modulator 446 is not actively modulating a signal, and in fact may be decoupled from the RF signal. For example, signal routing section 435 may be configured to decouple modulator 446 from the RF signal, or an impedance of modulator 446 may be adjusted to decouple it from the RF signal.

FIG. 5B shows version 524-B of components of circuit 424 of FIG. 4, further modified to emphasize a signal operation during a T→R interval (e.g., time interval 326 of FIG. 3). During the T→R interval, processing block 444 outputs a signal C_OUT, which may include a stream of symbols for transmission. Modulator 446 then generates a modulated signal from C_OUT and sends the modulated signal via antenna segment(s) coupled to IC contacts 432/433, as described above. During the T→R interval, rectifier and PMU 441 may be active, while demodulator 442 may not be actively demodulating a signal. In some embodiments, demodulator 442 may be decoupled from the RF signal during the T→R interval. For example, signal routing section 435 may be configured to decouple demodulator 442 from the RF signal, or an impedance of demodulator 442 may be adjusted to decouple it from the RF signal.

In typical embodiments, demodulator 442 and modulator 446 are operable to demodulate and modulate signals according to a protocol, such as the Gen2 Protocol mentioned above. In embodiments where circuit 424 includes multiple demodulators modulators, and/or processing blocks, each may be configured to support different protocols or different sets of protocols. A protocol specifies, in part, symbol encodings, and may include a set of modulations, rates, timings, or any other parameter associated with data communications. A protocol can be a variant of an internationally ratified protocol such as the Gen2 Protocol, for example including fewer or additional commands than the ratified protocol calls for, and so on. In some instances, additional commands may sometimes be called custom commands.

Figure 6:
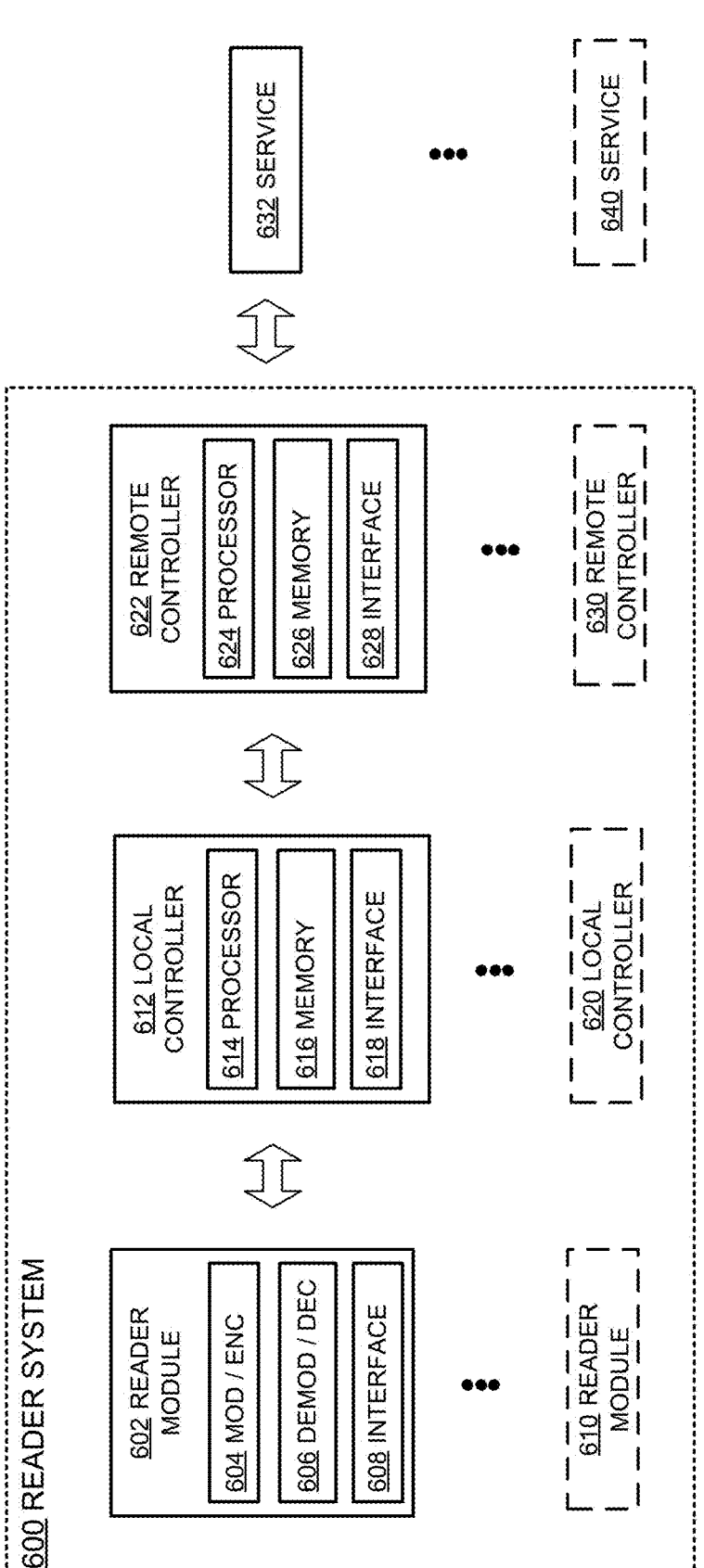
FIG. 6 is a block diagram showing a detail of an RFID reader system, such as the one shown in FIG. 1.

FIG. 6 depicts an RFID reader system 600 according to embodiments. Reader system 600 is configured to communicate with RFID tags and optionally to communicate with entities external to reader system 600, such as a service 632. Reader system 600 includes at least one reader module 602, configured to transmit signals to and receive signals from RFID tags. Reader system 600 further includes at least one local controller 612, and in some embodiments includes at least one remote controller 622. Controllers 612 and/or 622 are configured to control the operation of reader module 602, process data received from RFID tags communicating through reader module 602, communicate with external entities such as service 632, and otherwise control the operation of reader system 600.

In some embodiments, reader system 600 may include multiple reader modules, local controllers, and/or remote controllers. For example, reader system 600 may include at least one other reader module 610, at least one other local controller 620, and/or at least one other remote controller 630. A single reader module may communicate with multiple local and/or remote controllers, a single local controller may communicate with multiple reader modules and/or remote controllers, and a single remote controller may communicate with multiple reader modules and/or local controllers. Similarly, reader system 600 may be configured to communicate with multiple external entities, such as other reader systems (not depicted) and multiple services (for example, services 632 and 640).

Reader module 602 includes a modulator/encoder block 604, a demodulator/decoder block 606, and an interface block 608. Modulator/encoder block 604 may encode and modulate data for transmission to RFID tags. Demodulator/decoder block 606 may demodulate and decode signals received from RFID tags to recover data sent from the tags. The modulation, encoding, demodulation, and decoding may be performed according to a protocol or specification, such as the Gen2 Protocol. Reader module 602 may use interface block 608 to communicate with local controller 612 and/or remote controller 622, for example to exchange tag data, receive instructions or commands, or to exchange other relevant information.

Reader module 602 and blocks 604/606 are coupled to one or more antennas and/or antenna drivers (not depicted), for transmitting and receiving RF signals. In some embodiments, reader module 602 is coupled to multiple antennas and/or antenna drivers. In these embodiments, reader module 602 may transmit and/or receive RF signals on the different antennas in any suitable scheme. For example, reader module 602 may switch between different antennas to transmit and receive RF signals, transmit on one antenna but receive on another antenna, or transmit and/or receive on multiple antennas simultaneously. In some embodiments, reader module 602 may be coupled to one or more phased-array or synthesized-beam antennas whose beams can be generated and/or steered, for example by reader module 602, local controller 612, and/or remote controller 622.

Modulator/encoder block 604 and/or demodulator/decoder block 606 may be configured to perform conversion between analog and digital signals. For example, modulator/encoder block 604 may convert a digital signal received via interface block 608 to an analog signal for subsequent transmission, and demodulator/decoder block 606 may convert a received analog signal to a digital signal for transmission via interface block 608.

Local controller 612 includes a processor block 614, a memory 616, and an interface 618. Remote controller 622 includes a processor block 624, a memory 626, and an interface 628. Local controller 612 differs from remote controller 622 in that local controller 612 is collocated or at least physically near reader module 602, whereas remote controller 622 is not physically near reader module 602.

Processor blocks 614 and/or 624 may be configured to, alone or in combination, provide different functions. Such functions may include the control of other components, such as memory, interface blocks, reader modules, and similar; communication with other components such as reader module 620, other reader systems, services 632/640, and similar; data-processing or algorithmic processing such as encryption, decryption, authentication, and similar; or any other suitable function. In some embodiments, processor blocks 614/624 may be configured to convert analog signals to digital signals or vice-versa, as described above in relation to blocks 604/606; processor blocks 614/624 may also be configured to perform any suitable analog signal processing or digital signal processing, such as filtering, carrier cancellation, noise determination, and similar.

Processor blocks 614/624 may be configured to provide functions by execution of instructions or applications, which may be retrieved from memory (for example, memory 616 and/or 626) or received from some other entity. Processor blocks 614/624 may be implemented in any suitable way. For example, processor blocks 614/624 may be implemented using digital and/or analog processors such as microprocessors and digital-signal processors (DSPs); controllers such as microcontrollers; software running in a machine such as a general purpose computer; programmable circuits such as field programmable gate arrays (FPGAs), field-programmable analog arrays (FPAAs), programmable logic devices (PLDs), application specific integrated circuits (ASIC), any combination of one or more of these; and equivalents.

Memories 616/626 are configured to store information, and may be implemented in any suitable way, such as the memory types described above, any combination thereof, or any other known memory or information storage technology. Memories 616/626 may be implemented as part of their associated processor blocks (e.g., processor blocks 614/624) or separately. Memories 616/626 may store instructions, programs, or applications for processor blocks 614/624 to execute. Memories 616/626 may also store other data, such as files, media, component configurations or settings, etc.

In some embodiments, memories 616/626 store tag data. Tag data may be data read from tags, data to be written to tags, and/or data associated with tags or tagged items. Tag data may include identifiers for tags such as electronic product codes (EPCs), tag identifiers (TIDs), or any other information suitable for identifying individual tags. Tag data may also include tag passwords, tag profiles, tag cryptographic keys (secret or public), tag key generation algorithms, and any other suitable information about tags or items associated with tags.

Memories 616/626 may also store information about how reader system 600 is to operate. For example, memories 616/626 may store information about algorithms for encoding commands for tags, algorithms for decoding signals from tags, communication and antenna operating modes, encryption/authentication algorithms, tag location and tracking algorithms, cryptographic keys and key pairs (such as public/private key pairs) associated with reader system 600 and/or other entities, electronic signatures, and similar.

Interface blocks 608, 618, and 628 are configured to communicate with each other and with other suitably configured interfaces. The communications between interface blocks occur via the exchange of signals containing data, instructions, commands, or any other suitable information. For example, interface block 608 may receive data to be written to tags, information about the operation of reader module 602 and its constituent components, and similar; and may send data read from tags. Interface blocks 618 and 628 may send and receive tag data, information about the operation of other components, other information for enabling local controller 612 and remote controller 622 to operate in conjunction, and similar. Interface blocks 608/618/628 may also communicate with external entities, such as services 632, 640, other services, and/or other reader systems.

Interface blocks 608/618/628 may communicate using any suitable wired or wireless means. For example, interface blocks 608/618/628 may communicate over circuit traces or interconnects, or other physical wires or cables, and/or using any suitable wireless signal propagation technique. In some embodiments, interface blocks 608/618/628 may communicate via an electronic communications network, such as a local area network (LAN), a metropolitan area network (MAN), a wide area network (WAN), a network of networks such as the internet. Communications from interface blocks 608/618/628 may be secured, for example via encryption and other electronic means, or may be unsecured.

Reader system 600 may be implemented in any suitable way. One or more of the components in reader system 600 may be implemented as integrated circuits using CMOS technology, BJT technology, MESFET technology, and/or any other suitable physical implementation technology. Components may also be implemented as software executing on general-purpose or application-specific hardware.

In one embodiment, a "reader" as used in this disclosure may include at least one reader module like reader module 602 and at least one local controller such as local controller 612. Such a reader may or may not include any remote controllers such as remote controller 622. A reader including a reader module and a local controller may be implemented as a standalone device or as a component in another device. In some embodiments, a reader may be implemented as a mobile device, such as a handheld reader, or as a component in a mobile device such as a laptop, tablet, smartphone, wearable device, or any other suitable mobile device.

Remote controller 622, if not included in a reader, may be implemented separately. For example, remote controller 622 may be implemented as a local host, a remote server, or a database, coupled to one or more readers via one or more communications networks. In some embodiments, remote controller 622 may be implemented as an application executing on a cloud or at a datacenter.

Functionality within reader system 600 may be distributed in any suitable way. For example, the encoding and/or decoding functionalities of blocks 604 and 606 may be performed by processor blocks 614 and/or 624. In some embodiments, processor blocks 614 and 624 may cooperate to execute an application or perform some functionality. One of local controller 612 and remote controller 622 may not implement memory, with the other controller providing memory.

Reader system 600 may communicate with at least one service 632. Service 632 provides one or more features, functions, and/or capabilities associated with one or more entities, such as reader systems, tags, tagged items, and similar. Such features, functions, and/or capabilities may include the provision of information associated with the entity, such as warranty information, repair/replacement information, upgrade/update information, and similar; and the provision of services associated with the entity, such as storage and/or access of entity-related data, location tracking for the entity, entity security services (e.g., authentication of the entity), entity privacy services (e.g., who is allowed access to what information about the entity), and similar. Service 632 may be separate from reader system 600, and the two may communicate via one or more networks.

In some embodiments, an RFID reader or reader system implements the functions and features described above at least partly in the form of firmware, software, or a combination, such as hardware or device drivers, an operating system, applications, and the like. In some embodiments, interfaces to the various firmware and/or software components may be provided. Such interfaces may include application programming interfaces (APIs), libraries, user interfaces (graphical and otherwise), or any other suitable interface. The firmware, software, and/or interfaces may be implemented via one or more processor blocks, such as processor blocks 614/624. In some embodiments, at least some of the reader or reader system functions and features can be provided as a service, for example, via service 632 or service 640.

In general, an RFID tag IC has or stores one or more identifiers, which as described above is a number or bit sequence that identifies the tag IC or associated item. The identifier may contain information about the tag IC or item (e.g., a TID or an EPC) or may be used to look up information about the tag IC or item. The tag IC identifier may uniquely identify (at least within the constraints of a finite-length identifier) or be used to uniquely identify the tag IC or associated item.

In some communication protocols, such as the Gen2 Protocol, an RFID tag IC will send its identifier to a requesting reader without having previously received correct verification information or verifying that the reader is authorized to receive information from the tag IC. For example, any reader can send a Gen2 Query command to cause all RFID tag ICs matching the flags specified in the command to queue and eventually respond with their identifiers.

The above feature, while useful from the standpoint of making sure all RFID tag ICs can be detected, may be problematic for the privacy-oriented, who may want to keep their RFID tag ICs anonymous. One way to address this issue is to have privacy modes for RFID tag ICs. When an RFID tag IC is in a privacy mode, it may not respond to inventorying commands from unverified readers, without associated correct verification information, or may only respond with limited information. For example, an RFID tag IC in a recycling-enabled privacy mode, described in more detail below, may respond with recycling information for the tag IC or associated item but not with other identifying information.

Figure 7:
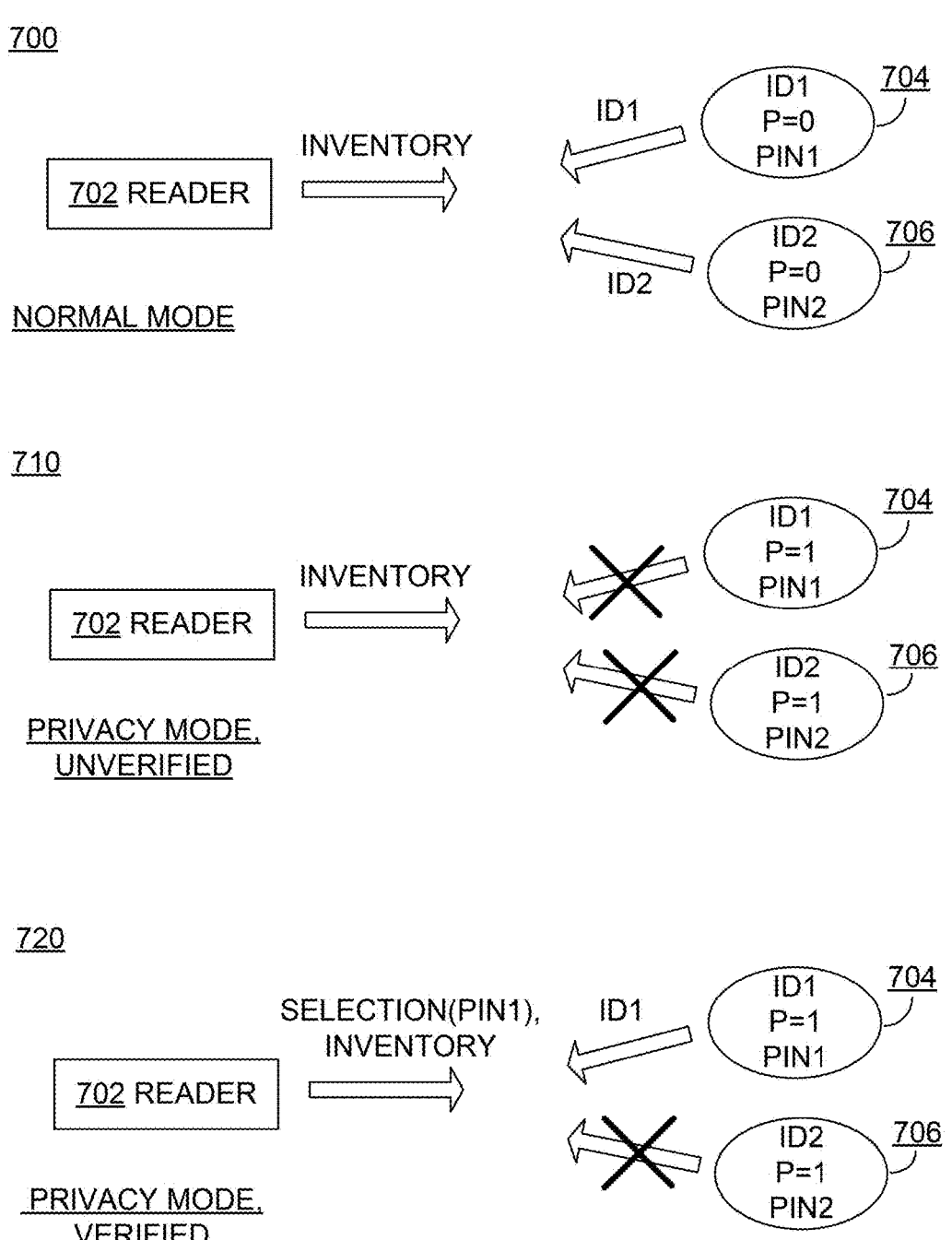
FIG. 7 depicts how RFID readers and tag ICs operate in normal and privacy modes, according to embodiments.

FIG. 7 depicts how RFID readers and tag ICs operate in normal and privacy modes, according to embodiments. FIG. 7 depicts an RFID reader 702 and RFID tag ICs 704 and 706 in several different modes of operation. Tag ICs 704 and 706 each have an identifier (labeled as "ID1" and "ID2", respectively), a privacy indicator denoted as "P", and a secret (labeled as "PIN1" and "PIN2", respectively).

A tag IC's privacy indicator indicates whether the tag IC is in a privacy mode. For example, if the privacy indicator is implemented as a flag or memory bit, it may be asserted or have a value of "1" if the tag IC is in a privacy mode and may be deasserted or have a value of "0" if the tag IC is not in a privacy mode. In some embodiments, a privacy indicator may be implemented using multiple memory bits. In these embodiments, the privacy indicator may be capable of having different values corresponding to different privacy modes. A tag IC's privacy indicator may be publicly accessible in some circumstances (for example, after the tag IC has received correct verification information, as described below), or may be entirely private and only readable by the tag IC itself. In some embodiments, a tag IC may use some means other than a privacy indicator to determine whether it is in a privacy mode.

Each tag IC has a secret that is preferably only known to the tag IC and to authorized entities. The secret may be a password, a personal identification number (PIN), a cryptographic key, or any other suitable information. A tag IC may determine whether to respond to a reader command based on whether the command indicates knowledge of the tag IC's secret. If the reader command indicates knowledge of the tag IC's secret, for example by including the secret or something derived from the secret, then the tag IC may determine that the reader command includes correct verification information and that the reader sending the command is verified. The tag IC may then respond to subsequent reader commands.

Diagram 700 depicts tag ICs 704 and 706 operating in a normal mode. When reader 702 transmits an inventorying command requesting tag IC identifiers (e.g., a Query of the Gen2 Protocol), tag ICs 704 and 706 respond with their identifiers, regardless of whether reader 702 has previously verified itself to the tag ICs by sending correct verification information. Specifically, tag IC 704 responds with "ID1" and tag IC 706 responds with "ID2".

Diagram 710 depicts tag ICs 704 and 706 operating in a privacy mode. In diagram 710, reader 702 does not send any verification information before transmitting an inventorying command requesting tag IC identifiers. In this situation, tag ICs 704 and 706 do not consider reader 702 verified, and therefore do not respond to subsequent commands from reader 702. Accordingly, reader 702 may not detect the presence of tag ICs 704 and 706 at all, much less retrieve tag IC identifying information.

Diagram 720 depicts tag ICs 704 and 706 again operating in a privacy mode. In contrast to the situation in diagram 710, here reader 702 first sends correct verification information before transmitting an inventorying command requesting tag IC identifiers. Specifically, reader 702 sends verification information by transmitting a selection command specifying the secret of tag IC 707 (PIN1). A selection command is a command that does not initiate an inventory round but provides information about how tag ICs should participate and/or behave during inventory rounds. For example, the Gen2 Select and Challenge commands are examples of selection commands. Tag IC 704, upon determining that the received verification information corresponds to its secret, determines that reader 702 is verified and responds to the inventorying command from reader 702 with its identifier ID1. Tag IC 706 however does not determine that reader 702 is verified or respond with its identifier because the verification information sent by reader 702 does not correspond to its secret.

While in diagram 720 reader 702 sends verification information in a selection command, in other embodiments a reader may send verification information in other commands. For example, a reader may send verification information in an inventorying command. Verification information may be divided between multiple commands; for example, a reader may send a first portion of verification information in a selection command and a second portion of verification information in an inventorying command, or multiple portions in separate inventorying commands.

Figure 8:
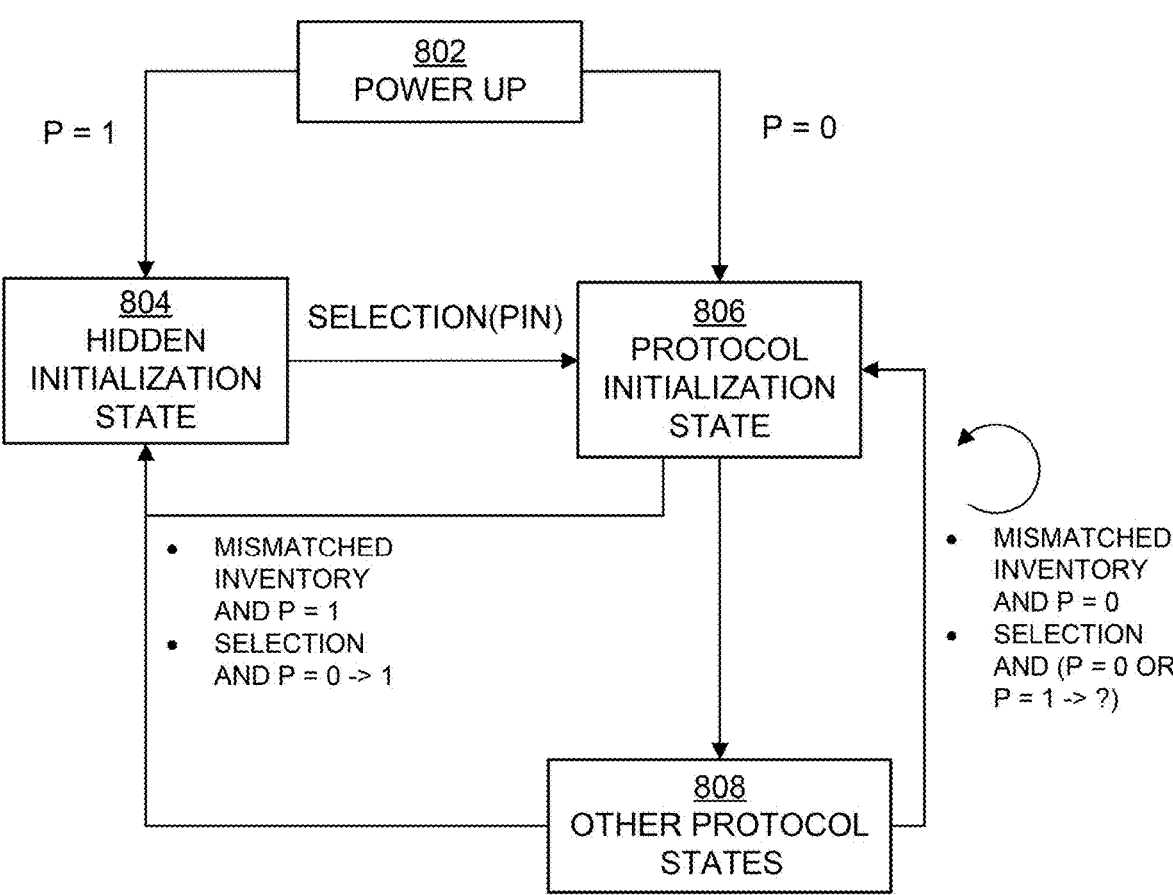
FIG. 8 depicts a partial state diagram for an RFID tag IC capable of operating in a privacy mode, according to embodiments.

FIG. 8 depicts a partial state diagram 800 for an RFID tag IC capable of operating in a privacy mode, according to embodiments. When an RFID tag IC powers up at step 802, for example upon entering the presence of an RFID reader supplying power or after resetting a tag IC controller, the tag IC controller (or processing block) uses its privacy indicator ("P") to determine whether the tag IC is in a privacy mode. If the controller determines that the tag IC is in a privacy mode (for example, P=1), then the controller causes the tag IC to transition to a hidden initialization state 804. If the controller determines that the tag IC is not in a privacy mode (for example, P=0), then the controller causes the tag IC to transition to a protocol initialization state 806 described in a communications protocol. In some embodiments, the protocol initialization state 806 may be the Ready state of the Gen2 Protocol.

When the tag IC is in the hidden initialization state 804, it does not respond to any commands from a reader (hence "hidden") unless the commands contain correct verification information and/or the reader is verified, as described above. In partial state diagram 800, a tag IC in the hidden initialization state 804 remains in state 804 unless a command (in this example, a selection command) including correct verification information (in this example, a PIN known to the tag IC) is received. Upon receiving the selection command including the correct PIN, the tag IC controller causes the tag IC to transition to the protocol initialization state 806. In other embodiments, any other means of verifying a reader or reader command as described above can cause the tag IC to transition to the protocol initialization state 806.

Upon reaching the protocol initialization state 806, the tag IC is now temporarily unhidden and can operate, respond, and transition to other protocol states 808 as described in the corresponding protocol (e.g., the Gen2 Protocol), with certain exceptions described below. Specifically, when the tag IC is in the protocol initialization state 806 or other protocol states 808 and therefore unhidden, the tag IC may behave and respond as described in the corresponding protocol unless the tag IC receives a selection command or a mismatched inventorying command, or some other event causes the tag IC to revert to being hidden. Selection commands are described above. A mismatched inventorying command is one that does not specify the tag IC, and therefore initiates or continues an inventory round in which the tag IC does not participate. For example, a mismatched Gen2 inventorying command may be a Query command that specifies values for Sel and Target that do not match the tag IC's corresponding values. In these cases, the tag IC may behave differently.

When unhidden and in the protocol states 806 or 808, if the tag IC receives a mismatched inventorying command, the tag IC controller determines whether the tag IC is in a privacy mode (for example, whether P is 0 or 1). If the controller determines that the tag IC is in a privacy mode, then the controller causes the tag IC to transition to the hidden initialization state 804. If the controller determines that the tag IC is not in a privacy mode, then the controller causes the tag IC to transition to (or stay in) the protocol initialization state 806.

When in the protocol states 806 or 808, if the tag IC receives a selection command, the tag IC controller determines whether the tag IC has recently transitioned to a privacy mode. The controller may determine that the tag IC has recently transitioned to a privacy mode if the privacy indicator P was 0 the last time the tag IC was in power up state 802 but is currently 1. In other embodiments, the controller may determine whether the tag IC has recently transitioned if a time duration between the last time P was 0 and the current time (where P is 1) is below a particular threshold. If the controller determines that the tag IC has recently transitioned to a privacy mode, then the controller causes the tag IC to transition to the hidden initialization state 804. If the controller determines that the tag IC has not recently transitioned to a privacy mode (for example, if the privacy indicator P (a) is currently 0 or (b) is currently 1 and was 1 the last time the tag IC was in state 802), then the controller causes the tag IC to transition to the protocol initialization state 806.

Other events may also cause a tag IC to revert to being hidden from being temporarily unhidden. For example, if the tag IC loses and then regains power, the tag IC may enter the power up state 802 and subsequently transition to hidden initialization state 804 if its privacy indicator P is currently 1. In some embodiments, a tag IC may only remain temporarily unhidden for a certain time duration before becoming hidden. The time duration may be measured (by, e.g., a counter) from when the tag IC last became temporarily unhidden (e.g., upon receipt of correct verification information), from when the tag IC last received a command, from when the tag IC last detected any command, or from any other suitable event.

In some embodiments, a tag IC may not revert to being hidden even upon receiving a mismatched inventorying command or receiving a selection command after recently transitioning to a privacy mode and may revert instead upon some other event. For example, a temporarily unhidden tag IC may remain unhidden until expiration of a time duration measured (by, e.g., a counter) from some event (e.g., as described above), until loss of power, or upon receiving a command instructing the tag IC to revert to being hidden.

A reader, upon providing correct verification information, may cause a tag IC to transition to and from a privacy mode. For example, when a tag IC has a privacy indicator value of 0 and therefore is not in a privacy mode, a reader, after providing correct verification information, can cause the tag IC to change its privacy indicator value from 0 to 1 and therefore transition into the privacy mode. In one specific embodiment, a reader may provide a correct Access password to the tag IC, as described in the Gen2 Protocol, to enable the reader to write a "1" value to the tag IC's privacy indicator. As another example, when a tag IC has a privacy indicator value of 1 and therefore is in a privacy mode, a reader can first cause the tag IC to participate in an inventory round by sending a selection command with correct verification information. Upon communicating with the tag IC in the inventory round, the reader can then cause the tag IC to change its privacy indicator value from 1 to 0 and therefore transition out of the privacy mode. In some embodiments, the reader may have to provide additional correct verification information to cause the tag IC to change its privacy indicator value to 0. The additional correct verification information may be the same information provided in the selection command or may be different information (e.g., another password or string known to the tag IC). In one embodiment, a reader may provide an Access password as verification information to cause a tag IC to become temporarily unhidden, then provide the Access password again to cause the tag IC to change its privacy indicator value.

In addition to causing a tag IC to transition to and from a privacy mode, a reader that provides correct verification information may also be able to update verification information stored on or known to a tag IC. For example, the reader may add, delete, or change verification information stored on the tag IC. The reader may also change the memory location where verification information is stored on the tag IC.

If a tag IC receives a command with incorrect verification information, then it may enter a timeout during which the tag IC does not respond to reader commands, even those that accompany or follow correct verification information. In some embodiments, a tag IC determines that a command includes incorrect verification information if the command specifies a memory location where verification information is stored but the verification information included in the command does not correspond to the stored verification information, or if the specified memory location is incorrect. The timeout may be based on time duration (for example, the timeout may expire after a certain time duration) or command rate (for example, the timeout may expire after a certain number of other commands without verification information have been received).

Figure 9:
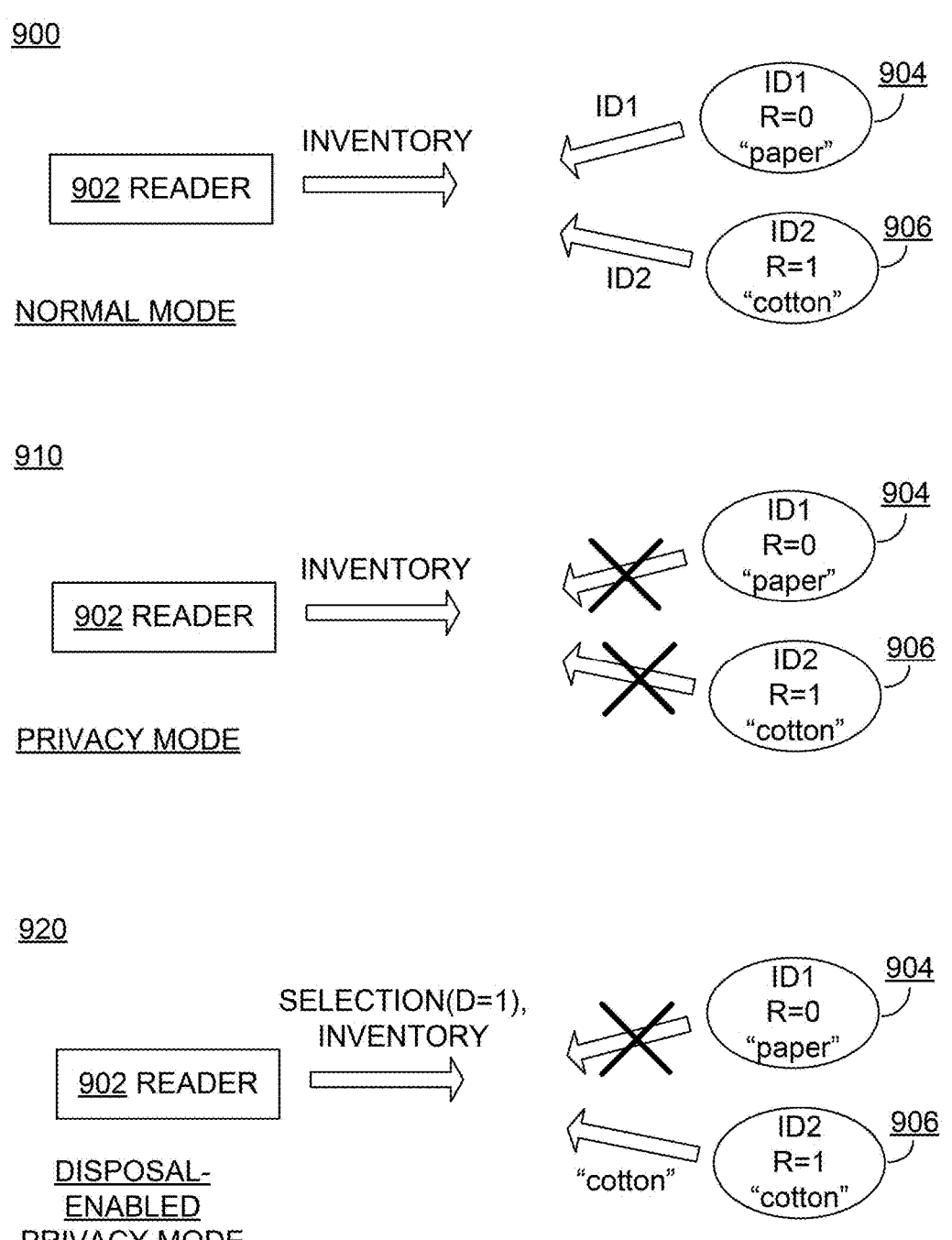
FIG. 9 depicts how RFID readers and tag ICs operate in a normal mode, a privacy mode, and a recycling-enabled privacy mode, according to embodiments.

FIG. 9 depicts how RFID readers and tag ICs operate in a normal mode, a privacy mode, and a recycling-enabled privacy mode, according to embodiments. FIG. 9 depicts an RFID reader 902 and RFID tag ICs 904 and 906 in several different modes of operation. Tag ICs 904 and 906 each have an identifier (labeled as "ID1" and "ID2", respectively), a "recycling indicator" denoted as "R", and recycling information. The recycling indicator shows whether the tag IC is configured to respond with its recycling information when in a privacy mode. For example, the recycling indicator may be "1" if the tag IC is configured to respond with its recycling information when in a privacy mode and "0" if the tag IC is not configured to respond with its recycling information when in the privacy mode. In some embodiments, another indicator on the tag IC may also serve as a recycling indicator. For example, the tag IC may have a mode indicator identifying whether the tag IC is in a normal mode or a privacy mode (e.g., a privacy indicator as described above). This mode indicator may further be configured to identify whether the tag IC is in a recycling-enabled privacy mode. As another example, the tag IC may have a "nonremovable" indicator or bit that indicates whether the tag IC is configured to be removed from its associated item, such as the NR bit described in the Gen2 Protocol. For example, a tag IC that is integrated into an item, as described above, may be considered "nonremovable" and have its nonremovable indicator asserted or deasserted accordingly. The nonremovable indicator may also be used to indicate whether the tag IC responds with its recycling information when in a privacy mode.

A tag IC's recycling information describes how the tag IC and/or its associated item can be recycled or disposed of. Recycling information may include item or tag composition, precautions to take during recycling or disposal, and any other information necessary for safe recycling or disposal. For example, tag IC 904 may store recycling information indicating that it or its associated item is "paper", whereas tag IC 906 may store recycling information indicating that it or its associated item is "cotton". In some embodiments, recycling information stored on a tag IC may indicate where additional recycling or disposal information can be found. For example, the stored recycling information may include an address or a link (e.g., a uniform resource locator or similar) to a network location or service (e.g., services 632 or 640). A user can then obtain additional recycling/disposal information for the item from the specified network location or service.

In some embodiments, a tag IC may be configured to allow its owner to decide whether to enable recycling-enabled privacy modes. For example, a tag IC owner may not want the tag IC to respond to unverified/unauthorized readers in any situation, even for disposal purposes. In this case, the tag IC will not participate in inventorying even if it receives a selection or other command specifying the tag IC's recycling indicator. This allows the tag IC owner to exert more control over how the tag IC responds (or doesn't respond).

Diagram 900 depicts tag ICs 904 and 906 operating in a normal mode, similar to diagram 700 above. When reader 902 transmits an inventorying command requesting tag IC identifiers (e.g., a Query of the Gen2 Protocol), tag ICs 904 and 906 respond with their identifiers, regardless of whether reader 902 is verified or has previously provided correct verification information. Specifically, tag IC 904 responds with "ID1" and tag IC 906 responds with "ID2".

Diagram 910 depicts tag ICs 904 and 906 operating in a privacy mode, similar to diagram 710 above. In this situation, if reader 902 transmits an inventorying command requesting tag IC identifiers, tag ICs 904 and 906 do not respond if reader 902 has not previously provided correct verification information. Accordingly, reader 902 may not be able to detect the presence of tag ICs 904 and 906 at all, much less retrieve tag IC identifying information. On the other hand, if reader 902 did previously provide correct verification information, then the tag ICs would respond with their respective identifiers.

Diagram 920 depicts tag ICs 904 and 906 operating in a recycling-enabled privacy mode. In this situation, tag ICs 904 and 906 are in a privacy mode and will not respond to reader 902 with their respective identifiers unless reader 902 has previously provided correct verification information. However, if reader 902 first transmits a selection command specifying a certain value for recycling indicator R and then transmits an inventorying command requesting tag IC identifiers, tag ICs in recycling-enabled privacy modes with matching R values may respond with their recycling information, regardless of whether correct verification information was provided. For example, suppose reader 902 transmits a selection command specifying an R value of "1" and then transmits an inventorying command requesting identifiers. Tag IC 904 has an R value of "0", so will not respond to the inventorying command. On the other hand, tag IC 906 has an R value of "1", so will respond to the inventorying command with its recycling information ("cotton") but will not respond with other identifying information.

Figure 10:
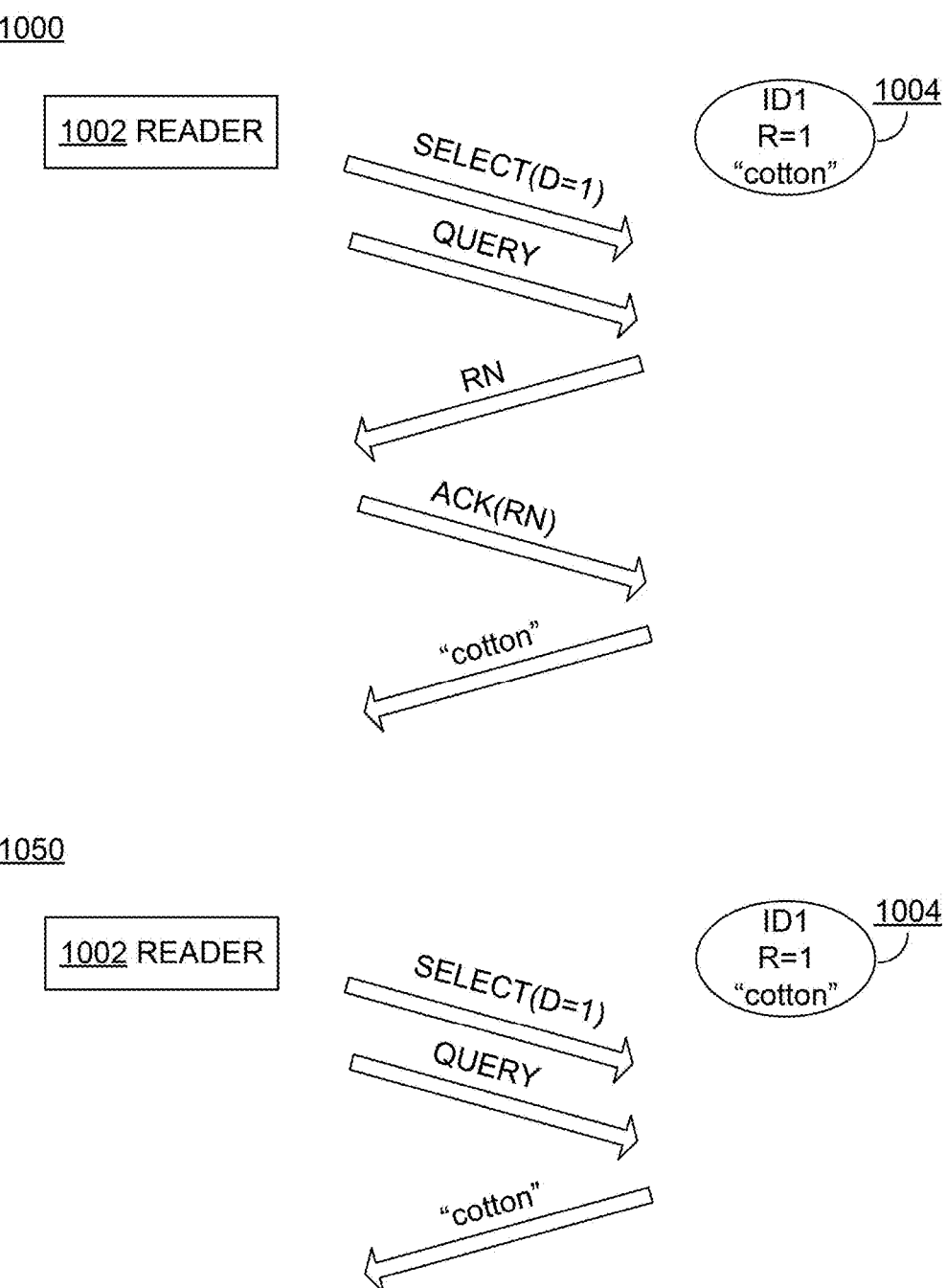
FIG. 10 illustrates interactions between an RFID reader and a tag IC in a recycling-enabled privacy mode, according to embodiments.

A tag IC may be configured to send its recycling information at any suitable point during an inventorying process. FIG. 10 illustrates interactions between an RFID reader and a tag IC in a recycling-enabled privacy mode, according to embodiments. FIG. 10 depicts an RFID reader 1002 and an RFID tag IC 1004. Tag IC 1004 has an identifier ID1, an asserted (="1") recycling indicator R, and recycling information "cotton". In diagram 1000, reader 1002 first transmits a selection command (e.g., a Select command according to the Gen2 Protocol) specifying asserted recycling indicators and then transmits a query command (e.g., a Query command according to the Gen2 Protocol) initiating an inventory round. When tag IC 1004 responds, it responds with a pseudorandom number RN. Reader 1002 then sends an acknowledge command (e.g., an ACK command according to the Gen2 Protocol) with the RN. Tag IC 1004 then responds to the acknowledge command with its recycling information.

Diagram 1050 depicts an alternate inventorying process involving tag IC recycling information. In diagram 1050, reader 1002 also first transmits a selection command specifying asserted recycling indicators and then transmits a query command initiating an inventory round. However, instead of responding with a pseudorandom number, tag IC 1004 responds with its recycling information. This behavior speeds up the overall inventorying process by removing the pseudorandom number exchange.

While in the above a reader elicits recycling information from tag ICs by first transmitting a selection command specifying a value for R and then transmitting an inventorying command, in other embodiments a reader may elicit recycling information in any suitable way. For example, a reader may transmit an inventorying command that specifies a value for R, and tag ICs with matching R values may respond with their recycling information, regardless of whether correct verification information was provided.

A selection command that both contains correct verification information and specifies asserted recycling indicators may cause one of several tag behaviors. For example, such a selection command may cause tag ICs in privacy modes that also have asserted recycling indicators to participate in subsequent inventory rounds by responding with their identifiers. Such a selection command could also cause tag ICs in privacy modes that also have asserted recycling indicators to participate in subsequent inventory rounds by responding with their identifiers and their recycling information in some particular format (e.g., concatenated with their identifiers, concatenated with another response, or as an entirely separate response).

An RFID tag IC configured with recycling-enabled privacy modes may have a partial state diagram similar to but different from partial state diagram 800. For example, such a tag IC may be configured to transition from a hidden initialization state (e.g., state 804) to a protocol initialization state (e.g., state 806) upon receiving a selection command either containing correct verification information or specifying a recycling indicator value. If the tag IC transitions from the hidden initialization state to the protocol initialization state due to specification of a recycling indicator value but not because correct verification information was received, the tag IC may operate according to the protocol but not provide access to information other than recycling information. For example, instead of responding with random numbers, identifiers, or other requested information, the tag IC may respond only with its recycling information. The tag IC may also ignore certain protocol commands, such as those pertaining to memory access or otherwise allowing access to other tag IC features. In this situation, the tag IC may be considered to be in a "hidden" state despite being configured to respond with recycling information, because it does not provide access to other, identifying information.

Figure 11:
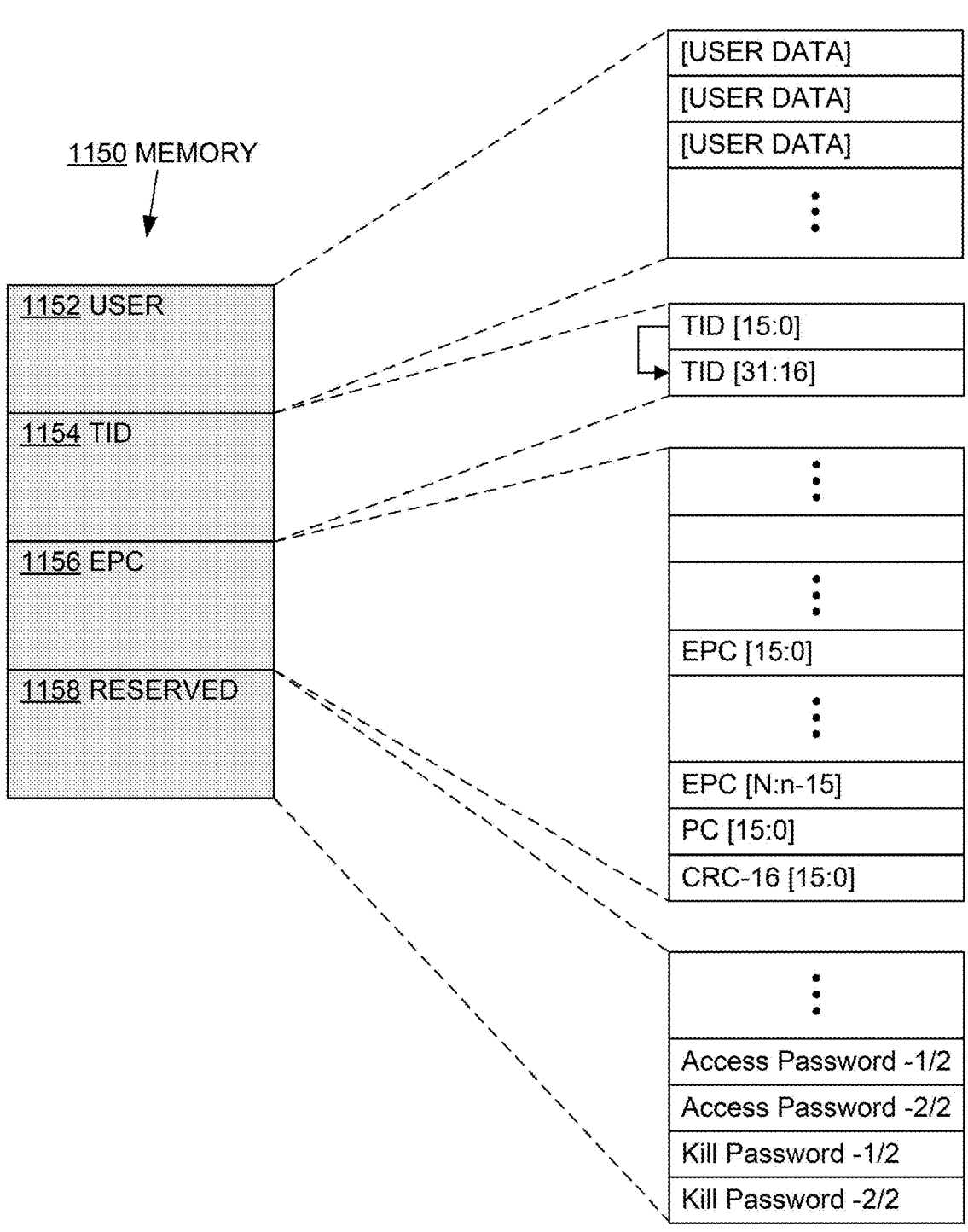
FIG. 11 is a diagram of an example RFID tag IC memory configuration, according to embodiments.

FIG. 11 is a diagram 1100 of an example RFID tag IC memory configuration, according to embodiments. Diagram 1100 depicts an RFID tag IC memory 1150, resembling the physical memory configuration described in the Gen2 Protocol. Memory 1150 includes four partitions or sections 1152, 1154, 1156, and 1158. Partition 1152 ("user memory") may be configured to store user data. Partition 1154 ("TID memory") may be configured to store an identifier for the tag IC itself, such as a tag identifier or TID. Partition 1156 ("EPC memory") may be configured to store an identifier for an item associated with or attached to the tag IC, such as an electronic product code or EPC. Partition 1158 ("Reserved memory") may be configured to store information reserved for the tag IC itself or otherwise not necessarily publicly accessible, such as passwords, PINs, cryptographic keys, or similar. The Gen2 Protocol specifies that two passwords, the Access password and the Kill password, can be stored in partition 1158. The Access password, if present, can be used to restrict certain tag IC operations as described in the Gen2 Protocol. The Kill password, if present, can be used to cause a tag IC to enter the Killed state as described in the Gen2 Protocol. As these passwords are sensitive, partition 1158 is generally not publicly accessible.

The configuration of tag IC memory 1150 is provided as an example. Tag IC memory can have any number of partitions configured to store any suitable information.

As described above, RFID tag ICs capable of recycling-enabled privacy modes may implement a recycling indicator and store recycling information. The recycling indicator may be implemented as a flag structure, similar to the flags described in the Gen2 Protocol, or as one or more bits in tag IC memory, such as the NR bit described in the Gen2 Protocol. An RFID tag IC may store recycling information in user memory, reserved memory, TID memory, EPC memory, and/or any other suitable memory location. In some embodiments, a tag or item identifier may include recycling information. For example, one or more bits of an EPC may indicate the composition of the associated item.

In some embodiments, verification information may be stored in partition 1158 or elsewhere in memory 1150. For example, memory 1150 may store a first string or sequence of bits at a first memory location. The tag IC may determine that a received command (e.g., a selection command) includes correct verification information if the command specifies the first string or bit sequence and specifies or addresses the first memory location. As another example, a tag IC may determine that a received command includes correct verification information if the command includes a known string or sequence of bits that is correctly encrypted with a cryptographic key known to the tag IC, with or without specifying or addressing a memory location. Data in memory 1150 may be stored, updated and/or erased during tag IC manufacture or during tag IC operation, for example in response to a reader command.

Verification information can be a preexisting password (e.g., the Access password) for reasons of memory economy, or can be an entirely separate string or password. To enable both, verification information sent from a reader can specify or address a static memory location that a receiving tag IC can map, point, or redirect to different actual memory locations. For example, suppose that the tag IC receives verification information that specifies both a certain memory location and a string or bit sequence that matches information stored at the certain memory location. Suppose further that verification information can be either a verification string stored at the certain memory location (for example, the beginning of partition 1152) or the Access password (stored in partition 1158). The certain memory location may be publicly accessible, but partition 1158 and its contents (e.g., the Access password) may be hidden or private to the tag IC. In other words, a reader command can specify and access information at the certain memory location, but either cannot specify or access locations in the hidden/private partition 1158 or an attempt to do so fails.

In some embodiments a tag IC may be configured to map a publicly accessible first memory location (e.g., the certain memory location described above) to a hidden or private memory location (e.g., a location in partition 1158). For example, the tag IC may be configured to map the first memory location either to itself (that is, the certain memory location) or to the Access password location, which otherwise would be hidden. If the tag IC has a verification string stored at the first memory location, then the tag IC may map the first memory location to itself. If the tag IC does not have a separate verification string, then the tag IC may map the first memory location to the Access password location instead. This dynamic mapping allows the received verification information to specify a static memory location (e.g., the first memory location) while tag ICs have the flexibility to store verification information in other memory locations, even in hidden or private memory locations (e.g., either the first memory location or the hidden Access password location).

In one embodiment, verification information can be one or more specific memory locations on the tag IC, independent of the information actually stored at those memory locations. In this situation, the specific memory locations serve as the tag IC secret. Upon receiving a command, the tag IC determines whether the command indicates those specific memory locations. If so, then the IC concludes that the command includes correct verification information.

In one embodiment, verification information can be a string or value cryptographically processed with a key known to the tag IC. In this situation, the key is never sent in a reader command reader or a tag IC reply. Instead, the tag IC receives a cryptographically processed version of a known value from a reader. The tag IC then uses its known key to determine whether the processed version corresponds to the known value. For example, the tag IC may recover a sequence from the version and compare the recovered sequence to the known value, or the tag IC may cryptographically process the known value to form a test version and compare the test version to the known value. If the recovered or test version corresponds to the known value, then the tag IC concludes that the reader knows the key and therefore has supplied correct verification information. The tag IC may be configured to precompute or preprocess the known value to form and store the test version so that the tag IC does not have to perform the computation or processing in real time during communications.

In one example implementation, a reader sends a selection command including a first multibit sequence (e.g., a random or pseudorandom number) and a version of the first sequence cryptographically processed using a key known to a tag IC. When the tag IC receives the selection command, it uses its key to determine whether the cryptographically processed version corresponds to the first sequence included in the selection command. For example, the tag IC may process the first sequence using the key and compare the processed sequence with the received version, or the tag IC may use the key to reverse the processing of the received version and compare the result with the received first version. If the two compared sequences correspond, then the tag IC may participate in a subsequent inventory round in a limited way. For example, in the subsequent inventory round the tag IC may reply to an inventorying command from the reader with a second multibit sequence (e.g., another random or pseudorandom number). The reader then generates a cryptographically processed version of the second sequence using the key and sends an acknowledgement command (e.g., a Gen2 ACK) including the version of the second sequence. Upon receiving the acknowledgement command, the tag IC again uses its key to determine whether the received version of the second sequence corresponds to the second sequence, similar to the comparison involving the first sequence described above. In some embodiments, the tag IC may precompute the correctly cryptographically processed version of the second sequence to compare with the version received from the reader, to avoid having to perform the computation after receiving the reader version. If the two compared sequences correspond, the tag IC may respond with one or more identifiers, in effect becoming unhidden. If not, the tag IC determines that correct verification information has not been received, and may exit the inventory round and return to a hidden state (e.g., the hidden initialization state 804). In some embodiments, if either of the comparisons fail, the tag IC may set a timeout during which the tag IC does not respond to the reader (or any reader), even if the reader subsequently sends correct verification information. While two sequential comparisons are described above, in some embodiments a tag IC may require more than two successful comparisons to occur before becoming unhidden. This may provide additional security, at the cost of inventorying speed.

Figure 12:
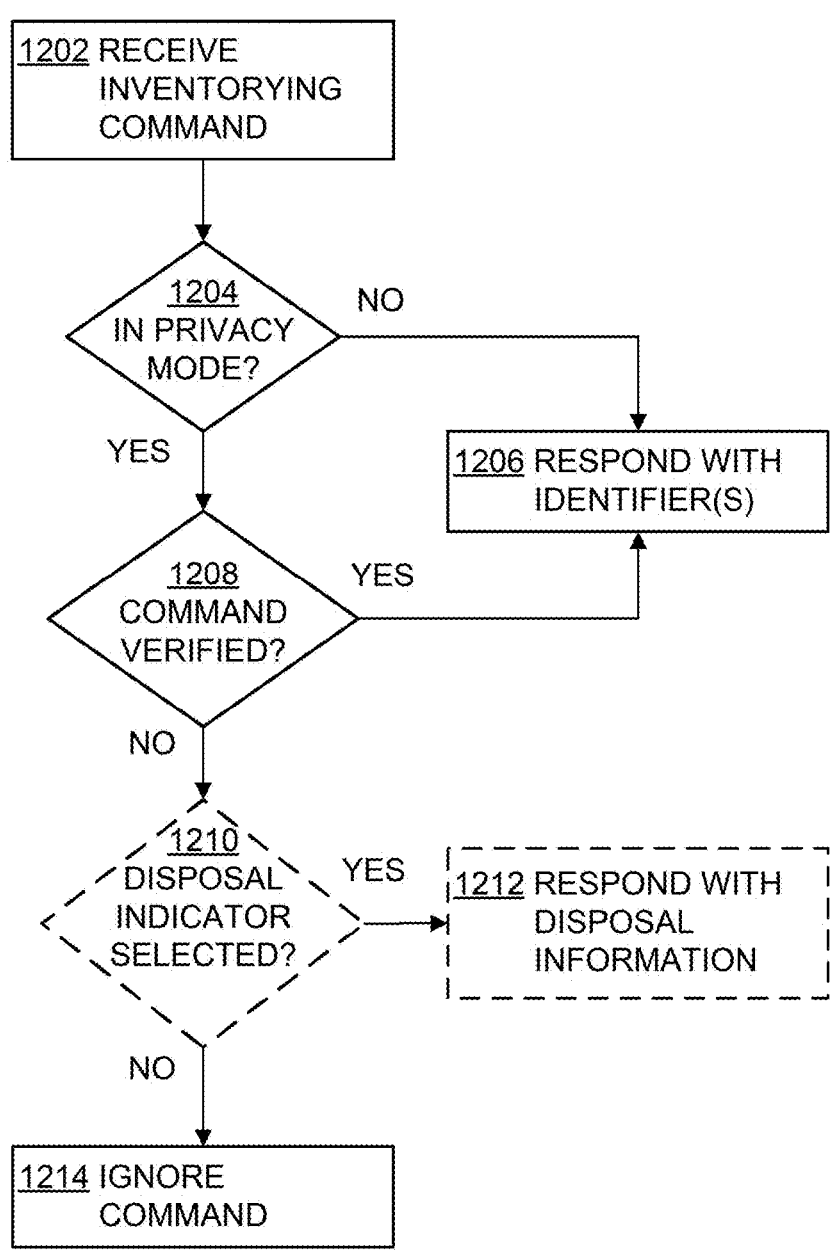
FIG. 12 depicts a process for an RFID tag IC in a privacy mode to respond to an inventorying command, according to embodiments.

FIG. 12 depicts a process 1200 for an RFID tag IC in a privacy mode to respond to an inventorying command, according to embodiments. Process 1200 begins at step 1202, where the tag IC receives an inventorying command from a reader. At step 1204, a controller (or processing block) of the tag IC determines whether the tag IC is currently in a privacy mode. For example, the tag IC may determine whether it has a privacy indicator with a certain value. If the tag IC is not in a privacy mode, then at step 1206 the controller causes the tag IC to respond with one or more identifiers, such as a pseudorandom or random number, a TID, an EPC, or similar.

If the tag IC is in a privacy mode, then at step 1208 the controller determines whether the inventorying command has been verified. For example, the controller may determine that the inventorying command has been verified if the inventorying command is accompanied by correct verification information, a preceding command containing correct verification information was received, and/or if a reader sending the inventorying command was previously verified (for example, has previously provided correct verification information). In some embodiments, the tag IC determines that received verification information is correct if (a) the verification information specifies both a memory location and a string or bit sequence that matches a string or bit sequence stored at the specified memory location on the tag IC, (b) the verification information specifies known memory location(s) on the tag IC, or (c) the verification information, when cryptographically processed (e.g., encrypted or decrypted) with a tag IC key, matches a string or bit sequence known to the tag IC. If at step 1208 the controller determines that the inventorying command has been verified, then the controller may cause the tag IC to become unhidden and respond with one or more identifiers at step 1206. In some embodiments, the tag IC may also respond to verified inventorying commands with its recycling information, as described above. After some time or event (e.g., power-down and subsequent power-up)

If at step 1208 the controller determines that the inventorying command has not been verified, then the controller may cause the tag IC to remain hidden and ignore the inventorying command at step 1214 by, for example, not responding with any tag IC information. If the tag IC supports recycling-enabled privacy modes, then the controller may instead determine whether a recycling indicator of the tag IC has been correctly selected at optional step 1210. For example, the controller may determine that the recycling indicator has been correctly selected if the correct recycling indicator location (e.g., if the recycling indicator is located at a certain location in tag IC memory) and value are specified by the inventorying command or a previous selection command. If the controller determines that the recycling indicator has been correctly selected, then at optional step 1212 the controller may cause the tag IC to become partially unhidden and respond with recycling information. If at optional step 1212 the controller determines that the recycling indicator has not been correctly selected, or if the tag IC does not support recycling-enabled privacy modes, then at step 1214 the controller may cause the tag IC to remain hidden and ignore the inventorying command.

In the above description, an RFID tag IC is configured to respond to a single inventorying command with different information, depending on a prior selection command. For example, an RFID tag IC in the recycling-enabled privacy mode described above that receives an inventorying command will, depending on a prior selection command, (a) respond with tag IC or item identifier(s) and optionally recycling information if the selection command includes correct verification information, (b) respond only with recycling information if the selection command correctly specifies a recycling indicator, or (c) not respond. This concept is not limited to only tag IC/item identifiers and recycling information. For example, an RFID tag IC may be configured to, depending on a prior selection command, (a) respond with different portions of a tag IC or item identifier, (b) respond with different combinations of tag IC or item identifiers, (c) respond with different information stored in tag IC memory, or (c) otherwise respond or behave differently.

The steps described in process 1200 are for illustrative purposes only. These steps may be implemented using additional or fewer steps and in different orders using the principles described herein.

RFID systems can use what is described above in any number of ways. For example, a retailer with RFID-tagged items can keep all tags in non-privacy modes in the store to facilitate inventorying, tracking, and loss-prevention. When a customer purchases an item, the associated tag can be placed into a privacy mode based on a secret known to the retailer and/or the customer. The customer can then leave the retailer without causing the retailer electronic article surveillance (EAS) system from triggering, because the EAS system will not even detect the tag in the privacy mode. If the customer later wishes to return the item and the retailer knows the secret, then the retailer can easily validate that the tag associated with the item being returned was the original tag (presumably attached to the same item, especially if the tag is configured to be nonremovable).

As another example, a person having multiple tagged items may place multiple associated tags into privacy modes based on a single secret, which can be referred to as a "group PIN" or "group key". The person can then use the single secret to track those tags, while others without access to the secret will not be able to even detect those tags.

As yet another example, RFID reader systems can be configured to retrieve recycling information from tags in privacy modes, even if the reader systems are not configured to otherwise verify themselves to tags in privacy modes. For example, recycling and waste disposal facilities and/or vehicles may be equipped with such reader systems. In one embodiment, a reader system may transmit a selection command specifying a certain recycling indicator value and/or certain recycling information at suitable times (e.g., periodically, upon the occurrence of an event such as receiving a load of waste material, upon receiving a command, etc.). The reader system then transmits inventorying commands, receives recycling information from suitably configured tags in privacy modes, and performs appropriate actions based on the received recycling information. For example, if the reader system receives recycling information indicating that at least one present item has material incompatible with a recycling or disposal process, the reader system may flag the entire load for further attention. As another example, the reader system may route a load of waste to different destinations based on the distribution of received recycling information.

As mentioned previously, embodiments are directed to RFID tag ICs with differing privacy levels and modes. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. Information represented by the states of these quantities may be referred-to as bits, data bits, samples, values, symbols, characters, terms, numbers, or the like. However, these and similar terms are associated with and merely convenient labels applied to the appropriate physical quantities, individually or in groups.

Embodiments furthermore include storage media. Such media, individually or in combination with others, have stored thereon instructions, data, keys, signatures, and other data of a program made according to the embodiments. A storage medium according to embodiments is a computer-readable medium, such as a memory, and can be read by a processor of the type mentioned above. If a memory, it can be implemented in any of the ways and using any of the technologies described above.

Even though it is said that a program may be stored in a computer-readable medium, it does not need to be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary or thought of in terms of various interconnected distinct software modules.

According to some examples, a method for a Radio Frequency Identification (RFID) integrated circuit (IC) that is in a hidden state to transition from the hidden state to the unhidden state, or to remain in the hidden state and provide recycling information while in the hidden state is described. The method may include receiving a selection command;

determining whether the selection command includes verification information, a request for the recycling information, or both; in response to a determination that the selection command includes verification information, determining whether the verification information is correct; in response to a determination that the verification information is correct, transitioning to the unhidden state and responding to a subsequent inventorying command with identifying information; in response to a determination that the selection command does not include verification information but includes the request for the recycling information, remaining in the hidden state and responding to the subsequent inventorying command with the recycling information but not the identifying information; and in response to a determination that the selection command does not include correct verification information or the request for the recycling information, remaining in the hidden state and not responding to the subsequent inventorying command.

According to other examples, the correct verification information may include one or more of: a correct personal identification number (PIN), a correct password, and information correctly encrypted based on a key known to the IC. Determining whether the selection command includes the request for recycling information may include determining whether the selection command specifies a nonremovable bit of the IC, the nonremovable bit indicating whether the IC can be removed from an associated item. The recycling information may not uniquely identify the IC and may indicate whether an item associated with the IC can be recycled; indicate a composition of the item; and/or indicate disposal information for the item. The recycling information may indicate where additional information about an item associated with the IC is located. The method may further include in response to a determination that the selection command contains both the correct verification information and the request for the recycling information, responding to the subsequent inventorying command with one or more of the identifying information and the recycling information. Responding to the subsequent inventorying command with the recycling information may include responding to the subsequent inventorying command with the recycling information in place of a random number.

According to further examples, a Radio Frequency Identification (RFID) integrated circuit (IC) may include a memory configured to store identifying information and recycling information; a transceiver configured to receive commands and send replies; and a processing block coupled to the memory and transceiver. The processing block may be configured to receive, via the transceiver, a selection command; determine whether the selection command includes verification information, a request for the recycling information, or both; in response to a determination that the selection command includes verification information, determine whether the verification information is correct; in response to a determination that the verification information is correct, transition to the unhidden state and responding to a subsequent inventorying command with the identifying information; in response to a determination that the selection command does not include verification information but includes the request for the recycling information, remain in the hidden state and responding to the subsequent inventorying command with the recycling information but not the identifying information; and in response to a determination that the selection command does not include correct verification information or the request for the recycling information, remain in the hidden state and not responding to the subsequent inventorying command.

According to yet other examples, the correct verification information may include one or more of: a personal identification number (PIN) in the memory, a password in the memory, and information correctly encrypted based on a key known to the IC. The IC may implement a nonremovable bit indicating whether the IC can be removed from an associated item, and the selection command may include the request for the recycling information by specifying the nonremovable bit. The recycling information may not uniquely identify the IC and may indicate whether an item associated with the IC can be recycled; indicate a composition of the item; and/or indicate disposal information for the item. The recycling information may indicate where additional information about an item associated with the IC is located. The processing block may be further configured to, in response to a determination that the selection command contains both the correct verification information and the request for the recycling information, respond to the subsequent inventorying command with one or more of the identifying information and the recycling information. The processing block may be configured to respond with the recycling information by responding to the subsequent inventorying command with the recycling information in place of a random number.

According to some examples, a method for a Radio Frequency Identification (RFID) integrated circuit (IC) that is in a hidden state to transition from the hidden state to the unhidden state, or to remain in the hidden state and provide recycling information while in the hidden state is described. The method may include receiving a selection command; determining whether the selection command includes verification information, a request for the recycling information, or both; in response to a determination that the selection command includes verification information, determining whether the verification information is correct; in response to a determination that the verification information is correct, transitioning to the unhidden state and responding to a subsequent inventorying command with identifying information; in response to a determination that the selection command does not include verification information but includes the request for the recycling information and the IC is configured to expose the recycling information, remaining in the hidden state and responding to the subsequent inventorying command with the recycling information but not the identifying information; and in response to a determination that the selection command does not include correct verification information or the request for the recycling information, remaining in the hidden state and not responding to the subsequent inventorying command.

According to other examples, the correct verification information may include one or more of: a correct personal identification number (PIN), a correct password, and information correctly encrypted based on a key known to the IC. Determining whether the selection command includes the request for recycling information may include determining whether the selection command specifies a nonremovable bit of the IC, the nonremovable bit indicating whether the IC can be removed from an associated item. The recycling information may not uniquely identify the IC and may indicate whether an item associated with the IC can be recycled; indicate a composition of the item; and/or indicate disposal information for the item. The recycling information may indicate where additional information about an item associated with the IC is located. The method may further include in response to a determination that the selection command contains both the correct verification information and the request for the recycling information, responding to the subsequent inventorying command with one or more of the identifying information and the recycling information. Responding to the subsequent inventorying command with the recycling information may include responding to the subsequent inventorying command with the recycling information in place of a random number.

According to one example, a method for an RFID IC is provided. The method may include, upon powering up, if the IC is in a privacy mode then transitioning to a hidden state in which the IC ignores inventorying commands by refraining from responding with an IC identifier, otherwise transitioning to an unhidden state in which the IC responds to inventorying commands with the IC identifier. The method further comprises, if the IC is in the privacy mode and also in the hidden state, ignoring any inventorying commands and temporarily transitioning from the hidden state to the unhidden state upon receiving correct verification information. The verification information may be provided in a selection command. The method may further include, if the IC is in the privacy mode and also in the unhidden state: responding with the IC identifier upon receiving an inventorying command specifying the IC, transitioning from the unhidden state to the hidden state without responding with the IC identifier upon receiving an inventorying command not specifying the IC, upon receiving a selection command transitioning from the unhidden state to the hidden state if the IC recently entered the privacy mode otherwise remaining in the unhidden state, and/or exiting the privacy mode upon receiving the verification information and instructions to exit the privacy mode. The method may further include, if the IC is not in the privacy mode and also in the unhidden state, responding with the IC identifier upon receiving the inventorying command specifying the IC and/or entering the privacy mode upon receiving the verification information and instructions to enter the privacy mode.

The foregoing detailed description has set forth various embodiments of the devices and/or processes via the use of block diagrams and/or examples. Insofar as such block diagrams and/or examples contain one or more functions and/or aspects, each function and/or aspect within such block diagrams or examples may be implemented individually and/or collectively, by a wide range of hardware, software, firmware, or virtually any combination thereof. Some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, tags, RFICs, readers, systems, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a Radio Frequency Identification (RFID) integrated circuit (IC) that is in a hidden state to transition from the hidden state to an unhidden state, or to remain in the hidden state and provide recycling information while in the hidden state, the method comprising:

when the IC is in the hidden state:
  receiving, by the IC, at least one of verification information or a request for the recycling information;
  in response to receiving the verification information, determining, by the IC, whether the verification information is correct;
  in response to a determination that the verification information is correct, transitioning to the unhidden state and responding to an inventorying command with identifying information;
  in response to receiving the request for the recycling information but not verification information, remaining in the hidden state and responding to the inventorying command only with the recycling information, but not the identifying information; and
  in response to a determination that the verification information is not correct and not receiving the request for the recycling information, remaining in the hidden state and therefore refrain from responding to the inventorying command.

2. The method of claim 1, wherein the correct verification information includes one or more of:
  a correct personal identification number (PIN),
  a correct password,
  information correctly encrypted based on a key known to the IC, and
  one or more memory locations on the memory of the IC.

3. The method of claim 1, wherein at least one of the verification information or the request for the recycling information is received in the inventorying command.

4. The method of claim 1, wherein the recycling information does not uniquely identify the IC and at least one of:
  indicates whether an item associated with the IC can be recycled;
  indicates a composition of the item;
  indicates disposal information for the item; or
  indicates where additional information about the item associated with the IC is located.

5. The method of claim 1, further comprising:
  determining whether the request for the recycling information was received based on whether a received command specifies a nonremovable bit of the IC, wherein the nonremovable bit indicates whether the IC can be removed from an associated item.

6. The method of claim 1, further comprising:
  in response to receiving the request for the recycling information and a determination verification information is correct, responding to the inventorying command with one or more of the identifying information and the recycling information.

7. The method of claim 1, wherein responding to the inventorying command with the recycling information comprises responding to the inventorying command with the recycling information in place of a random number.

8. A Radio Frequency Identification (RFID) integrated circuit (IC) comprising:
  a memory configured to store identifying information and recycling information;

a transceiver configured to receive commands and send replies; and a processing block coupled to the memory and transceiver and configured to:

when the IC is in a hidden state:

receive, via the transceiver, at least one of verification information or a request for recycling information;

in response to receiving the verification information, determine whether the verification information is correct;

in response to a determination that the verification information is correct, transition to an unhidden state and respond to an inventorying command with the identifying information;

in response to receiving the request for the recycling information but not verification information, remain in the hidden state and respond to the inventorying command only with the recycling information but not the identifying information; and in response to a determination that the verification information is not correct and not receiving the request for the recycling information, remain in the hidden state and therefore refrain from responding to the inventorying command.

9. The IC of claim 8, wherein the correct verification information includes one or more of:

a personal identification number (PIN) in the memory, a password in the memory, information correctly encrypted based on a key known to the IC, and one or more memory locations on the memory of the IC.

10. The IC of claim 8, wherein at least one of the verification information or the request for recycling information is received in the inventorying command.

11. The IC of claim 8, wherein the recycling information does not uniquely identify the IC and at least one of:

indicates whether an item associated with the IC can be recycled;

indicates a composition of the item;

indicates disposal information for the item; or indicates where additional information about the item associated with the IC is located.

12. The IC of claim 8, wherein the processing block is further configured to:

determine whether the request for recycling information was received based on whether a received command specifies a nonremovable bit of the IC, the nonremovable bit indicating whether the IC can be removed from an associated item.

13. The IC of claim 8, wherein the processing block is further configured to:

in response to receiving the request for the recycling information and a determination verification information is correct, responding to the inventorying command with one or more of the identifying information and the recycling information.

14. The IC of claim 8, wherein the processing block is configured to respond with the recycling information by responding to the inventorying command with the recycling information in place of a random number.

15. A method for a Radio Frequency Identification (RFID) integrated circuit (IC) that is in a hidden state to transition from the hidden state to an unhidden state, or to remain in the hidden state and provide recycling information while in the hidden state, the method comprising:

when the IC is in the hidden state:

receiving, by the IC, at least one of verification information or a request for the recycling information;

in response to receiving the verification information, determining, by the IC, whether the verification information is correct;

in response to a determination that the verification information is correct, transitioning to the unhidden state and responding to an inventorying command with identifying information;

in response to receiving the request for the recycling information but not verification information and a determination that the IC is configured to expose the recycling information, remaining in the hidden state and responding to the inventorying command only with the recycling information, but not the identifying information; and in response to a determination that the verification information is not correct and not receiving the request for the recycling information, remaining in the hidden state and therefore refrain from responding to the inventorying command.

16. The method of claim 15, wherein the correct verification information includes one or more of:

a correct personal identification number (PIN), a correct password, and information correctly encrypted based on a key known to the IC, and one or more memory locations on the memory of the IC.

17. The method of claim 15, wherein at least one of the verification information or the request for the recycling information is received in the inventorying command.

18. The method of claim 15, wherein the recycling information does not uniquely identify the IC and at least one of:

indicates whether an item associated with the IC can be recycled;

indicates a composition of the item;

indicates disposal information for the item; or indicates where additional information about an item associated with the IC is located.

19. The method of claim 15, further comprising:

in response to receiving the request for the recycling information and a determination verification information is correct, responding to the inventorying command with one or more of the identifying information and the recycling information.

20. The method of claim 15, wherein responding to the inventorying command with the recycling information comprises responding to the inventorying command with the recycling information in place of a random number.

* * * * *